Patented Nov. 4, 1947

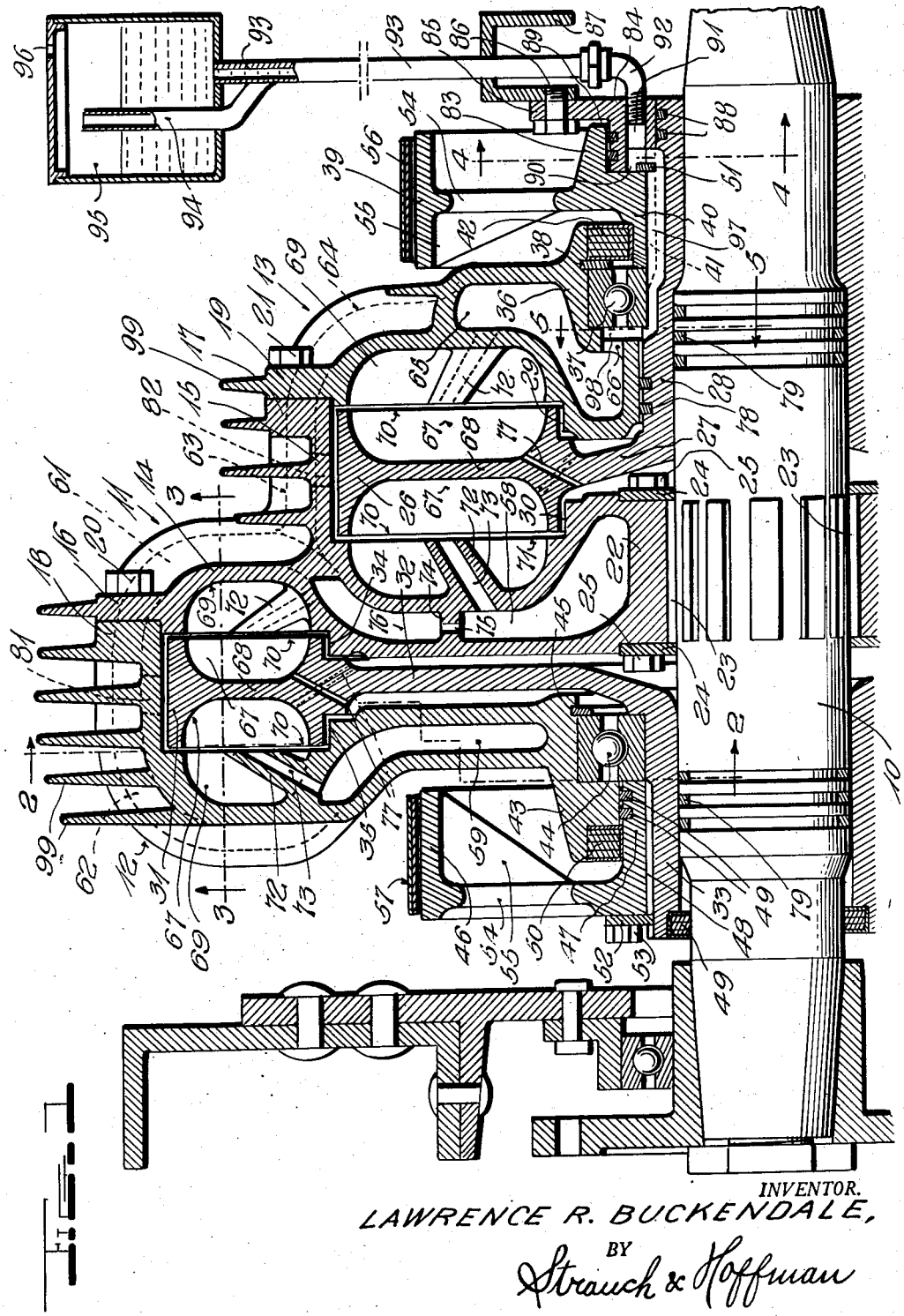

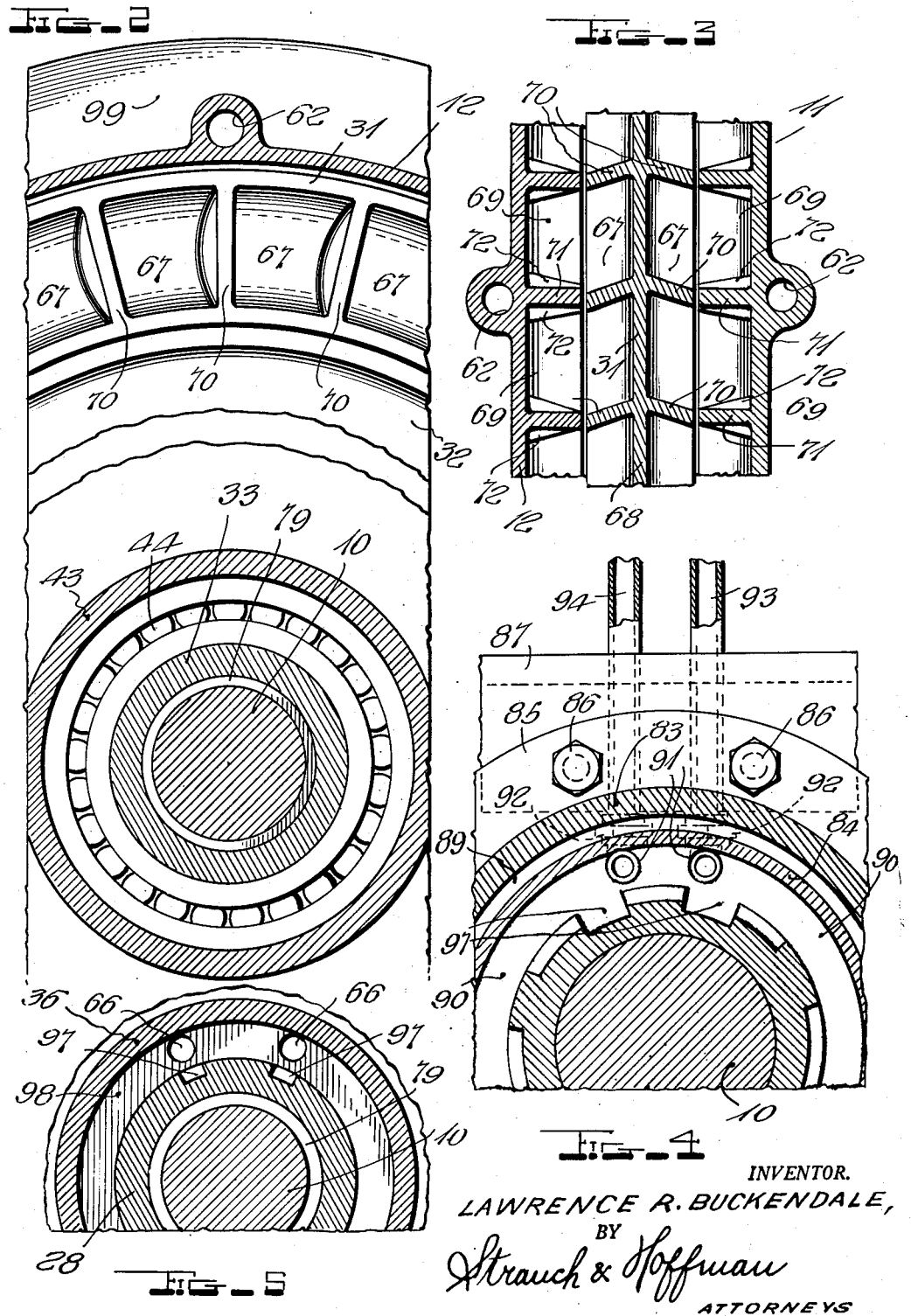

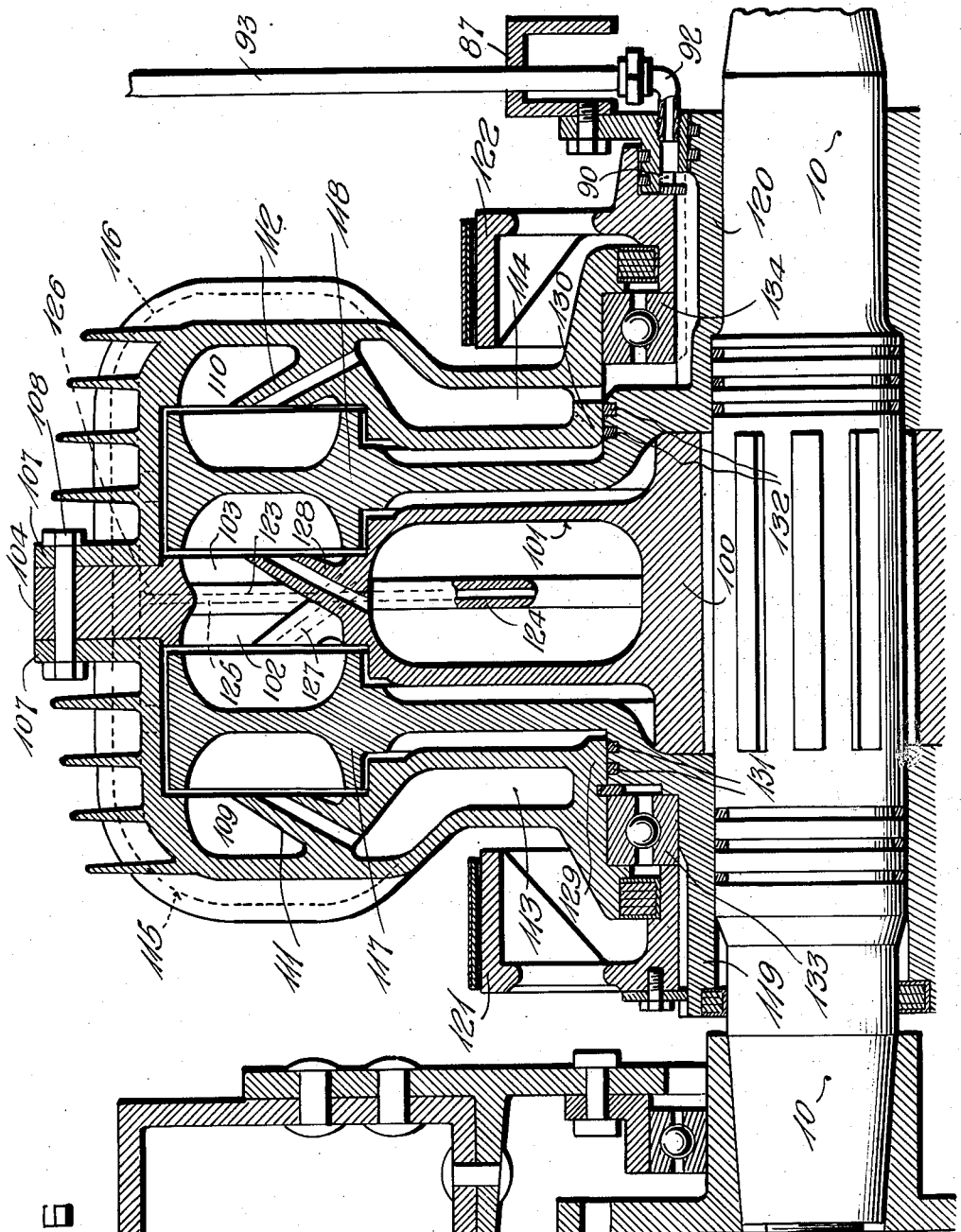

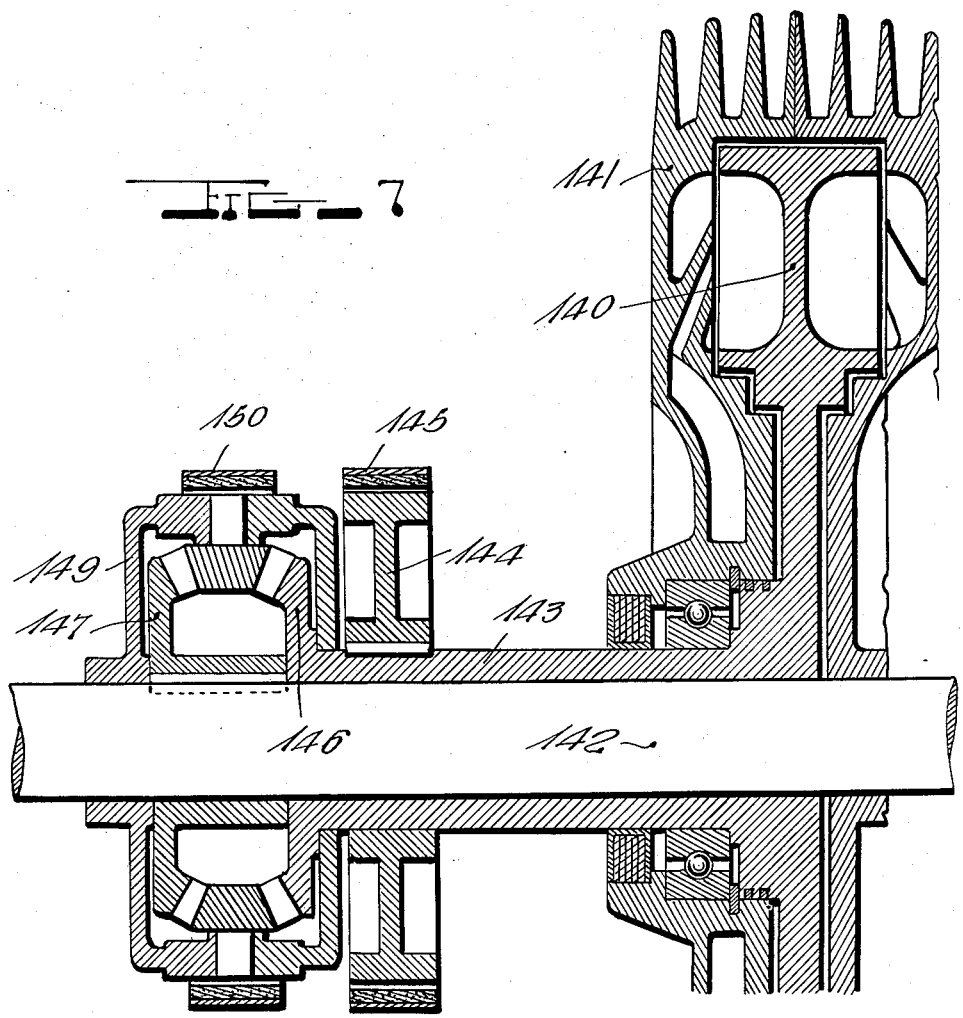

2,429,989

UNITED STATES PATENT OFFICE 2,429,989

HYDRODYNAMIC BRAKE

Lawrence R. Buckendale, Detroit, Mich., assignor to The Timken-Detroit Axle Company, Detroit, Mich., a corporation of Ohio Application July 31, 1944, Serial No. 547,337

15 Claims. (Cl. 188—90)

1

This invention relates to hydrodynamic brakes and more particularly to a braking mechanism of this type which may be advantageously employed to apply braking torque to the power transmission shaft of a motor vehicle and for other purposes.

The practical operation of such brakes, as heretofore proposed, has been found more or less unreliable and uncertain to progressively apply the braking torque to the rotating member in increments or stages of definite value. These prior suggestions involve the provision of complicated and costly adjusting mechanisms for regulating the retardent influence of the liquid upon a rotor fixed to the rotating member or shaft, or the use of a selectively shiftable gear mechanism to vary the relative speeds of rotation of the rotor and its housing or casing. Also, inadequate provision was made for the cooling of the braking liquid, maintenance costs were excessive, and the design and construction of such devices failed to meet the space limitations required for their use in motor vehicles.

It is, therefore, the general object and purpose of my present invention to provide a hydrodynamic brake constructed with a view to obviating the deficiencies of prior art brakes of this class, and particularly designed for application to motor vehicle drives, though not limited to such use.

Another object of the invention is to provide a multi-stage hydrodynamic brake having a single unit casing or housing structure fixed to the member to be braked, and a plurality of independently rotatable rotors cooperatively associated with said casing through a liquid medium to normally rotate as a unit with the casing, and means individual to each rotor to arrest the rotation thereof and apply braking torque to said casing and member.

A further object resides in the provision of a novel casing unit structure and multiple rotors of different diameters, the respective rotors and the casing having confronting liquid receiving cells of relatively different volumetric capacities, so that, when rotation of the rotors is successively arrested, braking torques of relatively different values will be applied to said casing.

An additional object is to provide a novel mounting and arrangement of manually operable friction brakes for selectively controlling rotation of the rotors which embody means for creating a

2 circulation of cooling air over the surfaces of the rotor casing.

A still further object of the invention is to provide the casing structure with a liquid circulating system for the purpose of internally cooling the casing walls and effectively lubricating all moving parts.

The invention has for another of its objects, in one embodiment thereof, to provide mechanical braking means for controlling or stopping rotation of the rotor independently of the power transmitting shaft and outer casing structure, and additional means operatively associated with the rotor for positively reversing its direction of rotation with respect to said shaft and casing structure so that the relative velocity factor will be increased for the transmission of high braking torque value to said shaft.

It is also an important object of the invention to provide novel means for maintaining an adequate supply of liquid to the rotor casing regardless of temperature changes, and to bleed air and vapor therefrom.

Among other subordinate features of the invention, reference is made to the simple and rugged structural form and compact assembly of the several parts, for efficient functional operation in a minimum space, thereby enabling the device to be readily adapted to motor vehicle use at comparatively low initial cost and maintenance expense.

Other objects and advantages of the present invention, not above specifically referred to, will be made manifest in the following description and subjoined claims, when considered in connection with the accompanying drawings, in which similar reference characters designate corresponding parts throughout the several views, and wherein:

Figure 1 is a diametrical sectional view showing one preferred embodiment of my improved hydrodynamic brake;

Figure 2 is a transverse sectional view taken substantially on the line 2—2 of Figure 1;

Figure 3 is a horizontal sectional view taken substantially on the line 3—3 of Figure 1;

Figure 4 is a transverse section taken substantially on the line 4—4 of Figure 1;

Figure 5 is a detail sectional view taken substantially on the lines 5—5 of Figure 1;

Figure 6 is a diametrical section, similar to

Figure 1, showing a slightly modified form of the invention; and

Figure 7 is a fragmentary vertical section of a further alternative embodiment of the invention.

With more detailed reference to the drawings, I have shown my improved hydrodynamic brake as applied to a shaft 10, which may be considered as the power driven or transmission shaft of a motor vehicle drive mechanism, mounted in the vehicle chassis in conventional manner.

In the embodiments of the invention which I have selected for illustration, there is provided a sectional casing or housing structure, which, as shown in Figure 1, may comprise a central section, generally indicated at 11, and the side sections 12 and 13, respectively. Each of these casing sections is of general circular form and the central section 11 includes an outer large diameter portion 14 and a laterally extending cylindrical portion 15 of relatively small diameter. The parts 14 and 15 are formed with bolting flanges 16 and 17, respectively, which are rigidly secured to similar flanges 18 and 19 on the casing sections 12 and 13, respectively, by bolts 20 and 21.

The central casing section 11 has an inner hub portion 22 securely fixed to the periphery of the shaft 10, as by the splines 23, and annular members 24 secured by bolts 25 to said hub and abutting the opposite ends of the splines 23.

A small diameter rotor is associated with the casing section 13 and the cylindrical part 15 of casing section 11, said rotor having an annular head 26 connected by a narrow web 27 with one end of the hub sleeve 28 which extends axially beyond the casing section 13 and loosely surrounds the shaft 10. It will be noted that the radial dimension of the rotor head 26 is appreciably greater than that of the web 27.

The casing section 13 and the part 15 of casing section 11 are recessed, as at 29 and 30, respectively, to receive the inner and outer cylindrical portions of the rotor head 26 for free rotation relative to the casing sections.

A similar rotor of relatively large diameter is associated with the casing sections 11 and 12, the annular head 31 thereof having a radial dimension which is considerably less than that of the rotor head 26, and of the web 32 which connects said head 31 to the inner end of hub sleeve 33, loosely surrounding shaft 10 and extending axially beyond the casing section 12. The casing sections are recessed as at 34 and 35, respectively, for free rotation of the rotor head 31 therebetween.

The casing section 13 has a hub portion 36 between which and the rotor hub sleeve 28 a suitable type of anti-friction bearing 37 is interposed and retained in applied position by the annular key 38. A friction brake drum 39 has a hub flange 40 splined to the rotor sleeve 28, as at 41. At the outer side of the bearing 37 a conventional oil seal 42 is positioned between the hub wall on casing section 13 and the brake drum flange 40.

Casing section 12 also has a hub portion 43 and the anti-friction bearing 44 between said hub and the rotor hub sleeve 33 is retained in place by the annular key 45. A second friction brake drum 46 has its hub flange 47 splined to the rotor sleeve 33, as at 48. At the outer side of bearing 44 the end of the brake drum hub is grooved to receive liquid seal rings 49 and the outer end of the casing hub 42 is recessed to receive the oil seal 50.

The inner hub ends of brake drums 39 and 46 abut the inner race rings of bearings 37 and 44, respectively, and are held against outward axial movement on the respective rotor sleeves by the retaining rings 51 and 52, respectively, seated in annular grooves in the splined ends of the respective rotor sleeves. Preferably the ring 52 is bolted, as at 53, to the hub of brake drum 46.

Preferably, the radial wall of each brake drum 39 and 46 is provided with a series of circumferentially spaced openings 54 and adjacent to each opening a reinforcing web 55 connects said wall with the cylindrical drum wall extending inwardly towards the rotor casing. These webs also act as fan blades to direct air currents outwardly between the edges of the brake drums and the casing walls to cool the latter. Conventional friction brake bands 56 and 57, respectively, are associated with the drums 39 and 46 and are adapted to be independently applied to the braking surfaces of said drums by any well known manually operable means.

The casing section 11 is provided with an annular liquid receiving chamber 58 and the casing section 12 with an annular chamber 59, said chambers being connected at diametrically opposite points by passages 61 and 62 in the walls of the respective casing sections, corresponding passages being connected in mating relation at the bolting flanges 16 and 18. The wall of the cylindrical portion 15 of casing section 11 also has passages 63 communicating at one of their ends with passages 61 and mating at their other ends with passages 64 in casing section 13, which communicate with the annular chamber 65 in the latter casing section. The several interconnected casing chambers 58, 59 and 65 are supplied with liquid through a plurality of inlet openings 66 in the wall of the chamber 65.

The rotor heads 26 and 31, and adjacent parts of the casing structure, are of similar cellular construction, and in the drawings the same reference characters have been applied to corresponding parts thereof. Referring now to Figures 1 and 3, each rotor head has two annular series of cells 67, separated by the radial wall 68, the open side of each of said series of cells being in adjacent confronting relation to the open side of a similar series of cells 69 in one of the casing sections. The rotor cells 67 are defined by the circumferentially spaced webs 70 and the casing cells are similarly defined by the spaced webs 71. Preferably the rotor cell forming webs 70 are at a slight angle to the axis of the rotor, as seen in Figure 3.

With each of the cell forming webs 71 of the casing a liquid jet delivery nozzle 72 is integrally formed, the discharge end of the nozzle bore 73 opening upon the edge of said web at the approximate radial center of the adjacent rotor cells, and at an oblique delivery angle with respect to the axis of rotation of the rotor.

The two sets of nozzles 72, associated with the rotor head 26, deliver low velocity liquid jets into the cells 67 at opposite sides of said head from the casing chambers 58 and 65, respectively. Preferably, in order that the jet velocities shall be substantially equal, the side walls of the annular casing chamber 58, outwardly of the inlet ends of the nozzles 72, are connected by the web 74, having spaced openings 75 therein, through which the liquid may flow into the outer high pressure section 76 of said chamber.

The two sets of nozzles 72 associated with the rotor head 31 deliver high velocity liquid jets into the rotor cells at opposite sides of said head from the section 76 of chamber 58 and from chamber 59, respectively.

Preferably, the liquid medium, with which the chambers of the casing structure are filled, is a suitable grade of oil, which also lubricates all relatively moving parts of the mechanism. To this end the ducts 77, formed through the inner side of the rotor heads 26 and 31 at circumferentially spaced intervals, discharge oil from the rotor cells on opposite sides of the rotor webs 27 and 32, to flow to the bearing 44 and between the rotor hub sleeves 33 and 28 and shaft 10, and between the latter sleeve and the inner cylindrical wall of casing section 13. Sealing rings 78 on sleeve 28 contact the inner surface of said casing wall, and similar sealing rings 79 on the shaft 10 contact the inner surfaces of the rotor sleeves 28 and 33. A conventional type of oil seal is positioned between the outer end of rotor sleeve 33 and the periphery of shaft 10. Also, the liquid is supplied to the outer peripheral surfaces of the rotors through spaced ports 81 and 82 communicating with the passages 62 and 63, respectively.

The hub portion of the brake drum 39 is also formed with an outwardly projecting annular flange 83 in concentrically spaced relation from the rotor hub sleeve 28. A coupling ring 84 extending between said sleeve and flange has a radially disposed arm or lug 85 securely bolted, as at 86, to a fixed part 87 of the supporting frame structure for the shaft 10. Sealing rings 88 and 89 establish fluid tight seals between the fixed coupling ring and the rotatable sleeve and flange 83, respectively. The inner end of the coupling ring 84 is cut away or recessed to form an annular liquid and air receiving space 90 between said ring and the hub of the brake drum 39. The ring 84 is provided with inlet ports, one of which is shown at 91, with which the threaded end of the elbow nipple 92 is connected. A similar nipple is connected to the other of said ports. The lower ends of liquid feed and air bleed pipes 93 and 94, respectively, are connected to said nipples. The upper end of pipe 93 is connected to the bottom of a tank or reservoir 95 in which a suitable head of liquid is maintained. The pipe 94 extends into said tank and above the liquid level. The top wall of the tank or reservoir is provided with a suitable air vent, indicated at 96.

Several of the splines 41, connecting brake drum 39 for unitary rotation with rotor sleeve 28, are milled out to provide longitudinally extending grooves or channels 97 forming communicating passages between the liquid receiving space 90 and the space 98 at the inner side of the bearing 37. From this space the liquid flows through inlet openings 66 into the casing chamber 65. The other casing chambers and the casing and rotor cells are also filled with the liquid through the inter-communicating passages 61, 62, 63 and 64. Air and vapor are also bled from the casing chambers through the channels or passages 97 to the pipe 94.

If desired, in addition to the air circulating webs 55 on the friction brake drums, external heat radiating fins 99 may be formed on the walls of the several casing sections 11, 12 and 13.

From the above description, the construction and operation of this embodiment of the invention will be readily understood. Assuming that the rotor casing has been substantially filled with liquid, when shaft 10 is rotated from a state of rest, the casing structure rotates as a unit therewith. In response to the influence of centrifugal force liquid will be delivered from the casing chambers 58 and 65 through nozzles 72 against the vanes or cell forming webs 70 of the rotor head 26 at low velocity, and against the vanes of the rotor head 31 at relatively high velocity, thus independently rotating said rotors. When the liquid pressures in the cells of each rotor and the cooperating casing cells substantially equalize, the rotation of the casing is transmitted through the liquid to the rotors and the latter will then rotate wih shaft 10 at substantially a 1-1 ratio.

When it is desired to brake the shaft 10, the operator first actuates the friction brake 56 to retard the rotation of rotor 26 and, in the relative rotation of the casing, the liquid will react at low pressure against the casing cell walls and, through the casing, apply braking torque of low value to the shaft. When friction brake 56 is fully applied, rotor 26 will then be fixed relative to shaft 10 and a definitely predetermined value of braking torque is applied to said shaft. The other rotor 31 now rotates independently of the casing and at a relatively higher speed, due to the high velocity pressure of the liquid jets from the nozzles 72 upon the walls of the rotor cells.

When it is desired to apply a braking torque of higher value to the shaft 10, after releasing brake 56, the operator actuates friction brake 57 to retard rotation of the rotor 31. It will be noted that the cells of this large diameter rotor and the mating cells of the casing are of much smaller volumetric capacity than the cells associated with the small diameter rotor 26, and being further spaced from the shaft axis the influence of centrifugal force on the liquid is much greater. Therefore, when rotor 31 is retarded, the reaction pressure of the liquid on the walls of the associated casing cells 69 is considerably greater than that which occurs in the larger cells associated with rotor 26 when rotation of the latter is retarded or stopped. Accordingly, a braking torque of relatively higher value will be transmitted through the casing to shaft 10 and when brake 57 is fully applied to hold rotor 31 in fixed position, a braking torque of another definite predetermined value is obtained.

Of course, the head of liquid in reservoir 95 is sufficiently great to maintain the system substantially filled with liquid at all times. Therefore, when it is desired to apply maximum braking torque to the shaft 10 in excess of the energy output of the power source, to prevent rotation of said shaft, as in parking a vehicle, the two friction brakes 56 and 57 are simultaneously fully applied to hold both rotors in fixed positions relative to the casing and shaft. The kinetic energy of the incompressible liquid bodies in the rotor and casing cells will, during movement of the liquid, effectively retard rotation of the casing and consequently of the shaft 10 and while said brakes are applied the rotors and liquid restrain the shaft and casing against rotation.

Thus it will be seen that by means of a very simply constructed mechanism, braking torque of a plurality of predetermined values may be impressed upon the shaft 10 and by properly controlling application of the friction brakes 56 and 57 intermediate torque values may be obtained to further control the rotating speed of said shaft. It is obvious, of course, that additional rotor units may be provided in those adaptations of the invention where a greater number of definite braking torque values would be desirable.

In Figure 6 of the drawings I have disclosed an alternative embodiment of the invention in which the two units are of equal capacity and have the same maximum braking effect upon the shaft 10. Otherwise, this construction differs from that first described principally in the form and construction of the central casing section. This central section 100 of the casing is splined to the shaft 10 as previously described and has an inner hollow portion providing an annular liquid receiving chamber 101. Outwardly of said chamber and at the same radial distance from the shaft axis the casing is formed with the two annular series of oppositely facing cells 102 and 103, respectively, and a peripheral flange 104 is secured between the flanges 107 on the side casing sections 105 and 106 by the bolts 108. The latter casing sections are formed with the cells 109 and 110 and nozzles 111 and 112, respectively, in similar manner to the construction shown in Figure 1. Also similar liquid receiving chambers 113 and 114 and circulating passages 115 and 116 are provided in the casing sections 105 and 106.

The rotors 117 and 118 in this case are of the same diameter, but otherwise of substantially the same construction as those shown in Figure 1, having hub sleeves 119 and 120, respectively, to which the drums 121 and 122 of friction brakes are fixedly connected.

In radial alignment with the passages 115 and 116, and the separating web 123 between the casing cells 102 and 103, liquid supply nozzles for the chamber 101 extend inwardly from the outer wall of said chamber as shown at 124. The bores of said nozzles are connected by passages 125 in the web 123 with outlet ports from the liquid circulating passages 115 and 116, as indicated at 126. Thus when the system is eventually filled with liquid from the tank or reservoir, as previously explained, the liquid will flow through ports 126 and nozzles 124 until the central casing chamber 101 is substantially filled.

The nozzles 127 and 128, alternately disposed on opposite sides of the web 124, deliver liquid jets, centrifugally discharged from chamber 101, into the adjacent cells of rotors 117 and 118, respectively. In this modified construction each rotor 117 and 118, at the inner ends of the hub sleeves 119 and 120, respectively, is formed with an external cylindrical shoulder 129 and 130, respectively. These shoulders are provided with sealing rings 131 and 132 in contact with the respective casing sections 105 and 106, at the inner sides of the bearing 133 and 134. The means for supplying the system with liquid and for bleeding air and vapor therefrom is substantially the same as above described in connection with the preferred embodiment of the invention.

The operation of this alternative construction is the same in principle as that previously described. However, due to the fact that the two rotors are of the same diameter and the rotor and casing cells of like volumetric capacities, when either of the friction brakes 121 or 122 is fully applied to hold the associated rotor against rotation, the same braking torque value will be transmitted to the shaft 10. When the two friction brakes are simultaneously actuated, the braking torque value is multiplied to stop rotation of the shaft 10 and hydraulically lock the casing structure and rotors against relative rotation.

In Figure 7 of the drawings I have shown an embodiment of my invention in which the hydrodynamic mechanism embodies a single rotor member 140 within the outer casing 141, which is fixed to the power driven shaft 142 to rotate therewith. The rotor and casing construction and the means for supplying the hydraulic medium to the casing chambers may be similar to that heretofore described. The hub 143 of the rotor is extended along the shaft in one direction externally of the casing and has brake drum 144 fixed thereto, provided with the friction brake band 145, as in the construction previously described.

With the rotor hub a differential unit to control the relative velocity of the rotor 140 and casing 141 is operatively associated. As herein shown this differential may be of conventional form having one side gear 146 fixed to the end of the rotor hub 143 and the other side gear 147 fixed to the shaft 142. The differential pinions 148 are carried by the case 149 which encloses the side gears and is loosely supported upon the shaft 142. With the outer peripheral wall of the differential case a friction brake band 150 is associated.

It will be evident from the above that when the brake band 150 is engaged with the differential case the rotor 140 is caused to rotate in an opposite direction with respect to the outer casing 141, thereby increasing the relative velocity factor and applying maximum braking torque to the power transmitting shaft 142. For the transmission of lower braking torque values to the shaft 142 the brake band 145 is engaged with drum 144 to control or stop rotation of the rotor member 140. By suitable connections with the operator's control lever brake 145 may first be applied to stop rotation of the rotor 140, and upon further movement of said lever the brake 145 is released and brake 150 applied to the differential case to reverse rotation of the rotor member 140.

If the fluid volume is maintained at all times on the rotor and casing blades, in the manner above explained, the characteristics of the hydrodynamic brake will always be predetermined.

This embodiment of the invention may be designed as a complete self-contained unit, not particularly dependent on the characteristics of the vehicle drive or its gear ratios, since the ratios of the differential gearing may be predetermined as required.

From the foregoing it will be seen that I have provided a hydrodynamic brake embodying a very compact organization of simply constructed mechanical parts, which is admirably adapted for use on motor vehicles, since it can be operatively mounted in a comparatively small space. As provision is made for the selective transmission of a multiplicity of braking torque values, the rotation of the power driven shaft may be effectively controlled as occasion may demand. The elimination of all gearing, and the means which I provide for adequately lubricating all moving parts and maintaining the liquid at relatively low temperature, contributes greatly to a low maintenance expense in the operation of such an apparatus.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. Hydrodynamic braking mechanism comprising a casing structure adapted to be fixed to a rotary member, means within said structure including a member axially fixed relative to said casing structure and rotatable independently thereof under pressure of a hydraulic medium induced by centrifugal force in the rotation of said structure, said independently rotatable member having a hub portion, anti-friction bearing means journalling said hub portion in one side wall of the casing structure, means for mechanically braking said member to create a reactive pressure influence of the hydraulic medium on the casing structure and transmit braking torque to said rotary member, said means including a brake drum secured upon said hub portion, and a fluid tight seal at the outer side of said bearing between said casing structure and the brake drum.

2. The braking mechanism defined in claim 1 in which said first named means includes a plurality of rotors freely rotatable relative to each other, and said braking means comprises mechanical braking devices individual to the respective rotors.

3. The braking mechanism defined in claim 1 in which said first named means includes a plurality of rotors freely rotatable relative to each other having pressure impulse receiving heads of relatively different diameters, and said braking means comprises selectively operable braking devices individual to the respective rotors.

4. The braking mechanism defined in claim 1 in which said first named means includes a plurality of independently rotatable rotors each having a peripheral head provided with an annular series of liquid receiving cells coacting with a confronting series of cells on the casing structure, the cells associated with the respective rotors being of relatively different volumetric capacities.

5. The braking mechanism defined in claim 1 in which said first named means includes a plurality of independently rotatable rotors of relatively different diameters, each having a peripheral head provided with an annular series of liquid receiving cells coacting with a confronting series of cells on the casing structure, the cells associated with the respective rotors being of relatively different volumetric capacities.

6. In combination with a rotary member, casing structure comprising three chambered sections adapted to receive a hydraulic medium, means for rigidly connecting said casing sections in assembled relation, means for rigidly securing the intermediate casing section to said rotary member, a rotor journalled in each of the other casing sections for independent rotation, the adjacent casing sections having means discharging the hydraulic medium under centrifugal pressure from the casing chambers to pressure impulse receiving means of the respective rotors, and means for independently retarding rotation of said rotors to produce a reactive pressure influence of the hydraulic medium on the casing structure and apply braking torque to said rotary member.

7. The combination defined in claim 6 in which the rotors are of relatively different diameters and the casing chambers associated with the respective rotors are located at different radial distances from the axis of said rotary member to discharge the hydraulic medium under centrifugal pressures of relatively different magnitudes.

8. Hydrodynamic braking mechanism including a plurality of chambered casing sections adapted to receive a hydraulic medium, a rotor between each two adjacent casing sections having an annular head of cellular construction, means for rigidly securing the casing sections to a rotary member, said casing sections having means for delivering the hydraulic medium from the casing chambers into the rotor cells under centrifugally induced pressure influence, each of said rotors having a hub sleeve journalled in one of the casing sections, a mechanical braking device for each rotor comprising a brake drum fixed to the rotor hub sleeve, means for supplying hydraulic medium to the casing chambers, including a fixed coupling ring, and means establishing a fluid tight relation between said coupling ring, one of the rotor hub sleeves, and a part on the brake drum associated therewith.

9. In a multi-stage hydrodynamic braking mechanism, casing structure adapted to be connected to a rotary member for unitary rotation therewith, a plurality of hydraulically impelled rotors associated with said casing structure for rotation with respect to said casing structure and to each other, said casing structure and rotors having means differentially determining the impelling influence of the hydraulic medium upon the respective rotors, and means exterior to the casing structure for controlling the independent rotation of said rotors, and operable to selectively retain the same in fixed position relative to the casing structure and rotary member to transmit a braking torque of selected value through the casing structure to said rotary member.

10. The braking mechanism defined in claim 8, in which the rotor hub sleeve is provided with an inlet passage in its periphery communicating with the casing chambers.

11. In combination with a rotary member, a casing fixed to said member, a rotor associated with said casing for free rotation relative to said casing and member and having a hub extension journalled in a side wall of the casing, said rotor and casing having coacting working cells for a hydraulic medium, manually operable means to retard rotation of said rotor and transmit braking torque to the rotary member through said casing, including a brake drum fixed to the outer end of the hub extension of the rotor, and means effective to supply the hydraulic medium to said casing during operation including an inlet passage therefor formed in the hub extension of the rotor.

12. In combination with a rotary member, a casing fixed to said member, a rotor having a hub extension journalled in the side wall of said casing for free rotation with respect to said member and casing, said rotor and casing having coacting working cells for a hydraulic medium, and manually operable means to retard rotation of said rotor and transmit braking torque to the rotary member through said casing, including a brake drum fixed to the hub extension of said rotor, said drum being provided with means for circulating air over and in contact with the walls of said casing.

13. Hydrodynamic braking apparatus comprising an impeller casing adapted for rotation with a supporting drive shaft; a turbine member within said casing, a hub on said turbine member rotatably mounted and axially fixed on said shaft and extending through said casing, a brake drum on said hub externally of said casing, and a fluid tight seal between said hub and said shaft externally of said casing.

14. Hydrodynamic braking apparatus comprising an impeller casing adapted for rotation with a supporting drive shaft, a plurality of independently functioning rotatable turbine members journalled on said shaft in axially fixed relation within said casing and adapted to be driven by rotation of said impeller, and means on each of said turbine members extending through said casing and having a brake element thereon externally of said casing.

15. In the apparatus defined in claim 14, two of said turbine elements being of different size and braking capacities.

LAWRENCE R. BUCKENDALE.

REFERENCES CITED

The following references are of record in the file of this patent:

UNITED STATES PATENTS

| Number | Name | Date |
| --- | --- | --- |
| 1,610,830 | Walker | Dec. 14, 1926 |
| 2,185,491 | Anderson et al. | Jan. 2, 1940 |
| 2,219,215 | Anderson | Oct. 22, 1940 |
| 2,280,897 | Denman | Apr. 28, 1942 |
| 2,241,189 | Dick | May 6, 1941 |
| 2,073,357 | Wemp | Mar. 9, 1937 |

FOREIGN PATENTS

| Number | Country | Date |
| --- | --- | --- |
| 466,436 | Great Britain | May 28, 1937 |